US008532099B2

(12) United States Patent
Kreeger et al.

(10) Patent No.: US 8,532,099 B2
(45) Date of Patent: *Sep. 10, 2013

(54) FORWARDING TABLE REDUCTION AND MULTIPATH NETWORK FORWARDING

(75) Inventors: Lawrence Kreeger, Fremont, CA (US); Thomas Edsall, Cupertino, CA (US); Elango Ganesan, Palo Alto, CA (US); Silvano Gai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 12/885,339

(22) Filed: Sep. 17, 2010

(65) Prior Publication Data

US 2011/0007741 A1    Jan. 13, 2011

Related U.S. Application Data

(63) Continuation of application No. 11/152,991, filed on Jun. 14, 2005, now Pat. No. 7,801,125.

(60) Provisional application No. 60/621,396, filed on Oct. 22, 2004.

(51) Int. Cl.
*H04L 12/28*    (2006.01)

(52) U.S. Cl.
USPC ........................................................ 370/389

(58) Field of Classification Search
USPC .......... 370/254–256, 351, 352, 389; 709/238
See application file for complete search history.

(56) References Cited

U.S. PATENT DOCUMENTS

| 5,402,416 A | 3/1995 | Cieslak et al. |
| 5,526,350 A | 6/1996 | Gittins et al. |

(Continued)

FOREIGN PATENT DOCUMENTS

| CN | 1778079 A | 5/2006 |
| EP | 1206099 | 5/2002 |

(Continued)

OTHER PUBLICATIONS

CN Office Action mailed Feb. 12, 2010, in Chinese Application No. 200580034955.8.

(Continued)

*Primary Examiner* — Chi Pham
*Assistant Examiner* — Robert Lopata
(74) *Attorney, Agent, or Firm* — Weaver Austin Villeneuve & Sampson LLP

(57) ABSTRACT

Increased usage of network links is provided and smaller forwarding tables are required. A combination of STP and Multipath methods may be implemented in a network. Frames may be forwarded between switches not only according to MAC addresses, but also according to switch IDs and local IDs. Switch IDs do not need to be globally unique, but should be unique within a particular network. Local IDs need only be unique within a particular switch. Some preferred implementations allow frames to be delivered in order to devices requiring in-order delivery. Preferably, core switches need only learn the switch IDs of each core switch and each edge switch, and the appropriate exit port(s) corresponding to each switch. Preferably, the forwarding tables of each edge switch indicate the addresses of each device attached to that edge switch, the address of each device that is in communication with an attached device and the address of every other switch in the network.

20 Claims, 12 Drawing Sheets

(56) References Cited

U.S. PATENT DOCUMENTS

| | | |
|---|---|---|
| 5,742,604 A | 4/1998 | Edsall et al. |
| 5,920,566 A | 7/1999 | Hendel et al. |
| 5,946,313 A | 8/1999 | Allan et al. |
| 5,974,467 A | 10/1999 | Haddock et al. |
| 6,021,124 A | 2/2000 | Haartsen |
| 6,104,699 A | 8/2000 | Holender et al. |
| 6,195,356 B1 | 2/2001 | Anello et al. |
| 6,201,789 B1 | 3/2001 | Witkowski et al. |
| 6,333,917 B1 | 12/2001 | Lyon et al. |
| 6,397,260 B1 | 5/2002 | Wils et al. |
| 6,404,768 B1 | 6/2002 | Basak et al. |
| 6,414,939 B1 | 7/2002 | Yamato |
| 6,456,590 B1 | 9/2002 | Ren et al. |
| 6,456,597 B1 * | 9/2002 | Bare .......................... 370/252 |
| 6,459,698 B1 | 10/2002 | Acharya |
| 6,504,836 B1 | 1/2003 | Li et al. |
| 6,529,489 B1 | 3/2003 | Kikuchi et al. |
| 6,556,541 B1 | 4/2003 | Bare |
| 6,556,578 B1 | 4/2003 | Silberschatz et al. |
| 6,560,198 B1 | 5/2003 | Ott et al. |
| 6,587,436 B1 | 7/2003 | Vu et al. |
| 6,636,524 B1 | 10/2003 | Chen et al. |
| 6,650,623 B1 | 11/2003 | Varma et al. |
| 6,671,258 B1 | 12/2003 | Bonneau |
| 6,721,316 B1 | 4/2004 | Epps et al. |
| 6,724,725 B1 | 4/2004 | Dreyer et al. |
| 6,839,794 B1 | 1/2005 | Schober |
| 6,885,633 B1 | 4/2005 | Mikkonen |
| 6,888,824 B1 | 5/2005 | Fang et al. |
| 6,901,593 B2 | 5/2005 | Aweya et al. |
| 6,904,507 B2 | 6/2005 | Gil |
| 6,917,986 B2 * | 7/2005 | Mor et al. .................... 709/238 |
| 6,934,256 B1 | 8/2005 | Jacobson et al. |
| 6,934,292 B1 | 8/2005 | Ammitzboell |
| 6,975,593 B2 | 12/2005 | Collier et al. |
| 6,976,581 B2 | 12/2005 | Medina et al. |
| 6,990,529 B2 | 1/2006 | Yang et al. |
| 6,999,462 B1 | 2/2006 | Acharya |
| 7,016,971 B1 | 3/2006 | Recio et al. |
| 7,020,715 B2 | 3/2006 | Venkataraman et al. |
| 7,046,631 B1 | 5/2006 | Giroux et al. |
| 7,046,666 B1 | 5/2006 | Bollay et al. |
| 7,047,666 B2 | 5/2006 | Hahn et al. |
| 7,093,024 B2 | 8/2006 | Craddock et al. |
| 7,133,405 B2 | 11/2006 | Graham et al. |
| 7,158,480 B1 | 1/2007 | Firoiu et al. |
| 7,190,667 B2 | 3/2007 | Susnov et al. |
| 7,197,047 B2 | 3/2007 | Latif et al. |
| 7,209,478 B2 | 4/2007 | Rojas et al. |
| 7,221,656 B1 | 5/2007 | Aweya et al. |
| 7,225,364 B2 | 5/2007 | Carnevale et al. |
| 7,246,168 B1 * | 7/2007 | Bales ........................... 709/228 |
| 7,266,122 B1 | 9/2007 | Hogg et al. |
| 7,266,598 B2 | 9/2007 | Rolia |
| 7,277,391 B1 | 10/2007 | Aweya et al. |
| 7,286,485 B1 | 10/2007 | Oulette et al. |
| 7,319,669 B1 | 1/2008 | Kunz et al. |
| 7,349,334 B2 | 3/2008 | Rider |
| 7,349,336 B2 | 3/2008 | Mathews et al. |
| 7,359,321 B1 | 4/2008 | Sindhu et al. |
| 7,385,997 B2 | 6/2008 | Gorti et al. |
| 7,400,590 B1 | 7/2008 | Rygh et al. |
| 7,400,634 B2 | 7/2008 | Higashitaniguchi et al. |
| 7,406,092 B2 | 7/2008 | Dropps et al. |
| 7,436,845 B1 | 10/2008 | Rygh et al. |
| 7,469,298 B2 * | 12/2008 | Kitada et al. ................... 709/236 |
| 7,486,689 B1 | 2/2009 | Mott |
| 7,529,243 B2 | 5/2009 | Sodder et al. |
| 7,561,571 B1 | 7/2009 | Lovett et al. |
| 7,564,869 B2 | 7/2009 | Cafiero et al. |
| 7,596,627 B2 | 9/2009 | Cometto et al. |
| 7,602,720 B2 | 10/2009 | Bergamasco et al. |
| 7,756,027 B1 * | 7/2010 | Reddy et al. .................. 370/230 |
| 7,801,125 B2 | 9/2010 | Kreeger et al. |
| 7,826,452 B1 * | 11/2010 | Bishara et al. ................. 370/392 |

| Publication No. | Date | Inventor |
|---|---|---|
| 2001/0043564 A1 | 11/2001 | Bloch et al. |
| 2001/0048661 A1 | 12/2001 | Clear et al. |
| 2002/0023170 A1 * | 2/2002 | Seaman et al. ................. 709/235 |
| 2002/0042671 A1 | 4/2002 | Chen et al. |
| 2002/0046271 A1 | 4/2002 | Huang |
| 2002/0085493 A1 | 7/2002 | Pekkala et al. |
| 2002/0085565 A1 | 7/2002 | Ku et al. |
| 2002/0103631 A1 | 8/2002 | Feldmann et al. |
| 2002/0141427 A1 | 10/2002 | McAlpine |
| 2002/0159385 A1 | 10/2002 | Susnow et al. |
| 2002/0188648 A1 | 12/2002 | Aweya et al. |
| 2002/0191640 A1 | 12/2002 | Haymes et al. |
| 2003/0002517 A1 | 1/2003 | Takajitsuko et al. |
| 2003/0026267 A1 | 2/2003 | Obermann et al. |
| 2003/0037127 A1 | 2/2003 | Shah et al. |
| 2003/0037163 A1 | 2/2003 | Kitada et al. |
| 2003/0084219 A1 | 5/2003 | Yao et al. |
| 2003/0091037 A1 | 5/2003 | Latif et al. |
| 2003/0118030 A1 | 6/2003 | Fukuda |
| 2003/0152063 A1 | 8/2003 | Giese et al. |
| 2003/0169690 A1 | 9/2003 | Mott |
| 2003/0193942 A1 | 10/2003 | Gil |
| 2003/0195983 A1 | 10/2003 | Krause |
| 2003/0202536 A1 | 10/2003 | Foster et al. |
| 2003/0223416 A1 | 12/2003 | Rojas et al. |
| 2003/0227893 A1 | 12/2003 | Bajic |
| 2004/0008675 A1 | 1/2004 | Basso et al. |
| 2004/0013088 A1 | 1/2004 | Gregg |
| 2004/0013124 A1 | 1/2004 | Peebles et al. |
| 2004/0024903 A1 | 2/2004 | Costatino et al. |
| 2004/0032856 A1 | 2/2004 | Sandstrom |
| 2004/0042448 A1 | 3/2004 | Lebizay et al. |
| 2004/0042477 A1 | 3/2004 | Bitar et al. |
| 2004/0076175 A1 | 4/2004 | Patenaude |
| 2004/0078621 A1 | 4/2004 | Talaugon et al. |
| 2004/0081203 A1 | 4/2004 | Sodder et al. |
| 2004/0100980 A1 | 5/2004 | Jacobs et al. |
| 2004/0120332 A1 | 6/2004 | Hendel |
| 2004/0156390 A1 | 8/2004 | Prasad et al. |
| 2004/0196809 A1 | 10/2004 | Dillinger et al. |
| 2004/0213243 A1 | 10/2004 | Lin et al. |
| 2004/0240459 A1 | 12/2004 | Lo et al. |
| 2005/0002329 A1 | 1/2005 | Luft et al. |
| 2005/0018606 A1 | 1/2005 | Dropps et al. |
| 2005/0025179 A1 | 2/2005 | McLaggan et al. |
| 2005/0138243 A1 | 6/2005 | Tierney et al. |
| 2005/0141419 A1 | 6/2005 | Bergamasco et al. |
| 2005/0141568 A1 | 6/2005 | Kwak et al. |
| 2005/0169188 A1 | 8/2005 | Cometto et al. |
| 2005/0169270 A1 | 8/2005 | Mutuo et al. |
| 2005/0190752 A1 | 9/2005 | Chiou et al. |
| 2005/0226149 A1 | 10/2005 | Jacobson et al. |
| 2005/0238064 A1 | 10/2005 | Winter et al. |
| 2006/0002385 A1 | 1/2006 | Johnsen et al. |
| 2006/0023708 A1 | 2/2006 | Snively |
| 2006/0087989 A1 | 4/2006 | Gai et al. |
| 2006/0098589 A1 | 5/2006 | Kreeger et al. |
| 2006/0101140 A1 | 5/2006 | Gai et al. |
| 2006/0146832 A1 | 7/2006 | Rampal et al. |
| 2006/0187832 A1 | 8/2006 | Yu |
| 2006/0198323 A1 | 9/2006 | Finn |
| 2006/0251067 A1 | 11/2006 | DeSanti et al. |
| 2007/0041321 A1 | 2/2007 | Sasaki et al. |
| 2007/0047443 A1 | 3/2007 | Desai et al. |
| 2007/0081454 A1 | 4/2007 | Bergamasco et al. |
| 2007/0115824 A1 | 5/2007 | Chandra et al. |
| 2007/0121617 A1 | 5/2007 | Kanekar et al. |
| 2007/0183332 A1 | 8/2007 | Oh et al. |
| 2007/0280207 A1 * | 12/2007 | Shimizu et al. ................. 370/353 |
| 2008/0069114 A1 | 3/2008 | Shimada et al. |
| 2008/0098247 A1 | 4/2008 | Sane et al. |
| 2008/0186968 A1 | 8/2008 | Farinacci et al. |
| 2008/0212595 A1 | 9/2008 | Figueira et al. |
| 2008/0259798 A1 | 10/2008 | Loh et al. |
| 2008/0273465 A1 | 11/2008 | Gusat et al. |
| 2009/0010162 A1 | 1/2009 | Bergamasco et al. |
| 2009/0052326 A1 | 2/2009 | Bergamasco et al. |
| 2009/0232138 A1 | 9/2009 | Gobara et al. |
| 2009/0252038 A1 | 10/2009 | Cafiero et al. |

FOREIGN PATENT DOCUMENTS

| WO | WO 2004/064324 | 7/2004 |
|----|----------------|--------|
| WO | WO 2006/047092 | 5/2006 |
| WO | WO 2006/047109 | 5/2006 |
| WO | WO 2006/047194 | 5/2006 |
| WO | WO 2006/047223 | 5/2006 |
| WO | WO 2006/057730 | 6/2006 |
| WO | WO 2006/063922 | 6/2006 |
| WO | WO 2007/050250 | 5/2007 |

OTHER PUBLICATIONS

EPO Office Action mailed Jun. 18, 2010, in EP Application No. 08728248.9.
US Office Action mailed Jun. 24, 2010 in related U.S. Appl. No. 11/084,587.
US Final Office Action mailed Jun. 11, 2010 in related U.S. Appl. No. 11/400,671.
US Notice of Allowance mailed Jun. 28, 2010 in related U.S. Appl. No. 11/094,877.
US Office Action mailed Jan. 24, 2008 in related U.S. Appl. No. 11/152,991.
US Final Office Action mailed Sep. 8, 2008 in related U.S. Appl. No. 11/152,991.
US Office Action mailed Mar. 4, 2009 in related U.S. Appl. No. 11/152,991.
US Final Office Action mailed Aug. 18, 2009 in related U.S. Appl. No. 11/152,991.
US Notice of Allowance mailed Dec. 31, 2009 in related U.S. Appl. No. 11/152,991.
US Notice of Allowance mailed May 17, 2010 in related U.S. Appl. No. 11/152,991.
US Office Action mailed May 13, 2010 in related U.S. Appl. No. 11/248,933.
CN Office Action mailed Aug. 11, 2010, Appl. No. 200580034955.8.
CN Office Action mailed Dec. 3, 2010 Appl. No. 200580034955.8.
IEEE Standards 802.3™—2002, IEEE Computer Society, Mar. 8, 2002, 1538 pages.
MAC Control PAUSE Operation, 31B.3.1 Transmit Operation, Annex 31B, IEEE Std 802.3ae-2002, 4 pages.
IEEE Standards 802.3ah™—2004, IEEE Computer Society, Sep. 7, 2004, 623 pages.
MAC Control PAUSE Operation, 31B.1 PAUSE description, Annex 31B, IEEE Std 802.3, 1998 Edition, 11 pages.
IEEE Standards 802.3ak™—2004, IEEE Computer Society, Mar. 1, 2004, 52 pages.
31. MAC Control, IEEE Std 802.3-2002, Section Two, 9 pages.
Mekkittikul et al., A Practical Scheduling Algorithm to Achieve 100% Throughput in Input-Queued Switches, Computer Systems Laboratory, Stanford University, 1998, 8 pages.
J. Moy, OSPF Version 2 (RFC 2178), Network Working Group, Cascade Communications Corp., Jul. 1997, 211 pp.
Floyd et al., Random Early Detection Gateways for Congestion Avoidance, Lawrence Berkeley Laboratory, Univ. of California, IEEE/ACM Transactions on Networking, Aug. 1993, 22 pages.
Ramakrishnan et al., "The Addition of Explicit Congestion Notification (ECN) to IP," RFC 3168, Sep. 2001.
InfiniBand Arch, Spec, vol. 1. Oct. 24, 2000 Final. Infiniband SM Trade Association.
InfiniBand Arch, Spec, vol. 2. Oct. 24, 2000 Final. Infiniband SM Trade Association.
Cisco Systems, Inc., "Cisco data Center Network Architecture and Solutions Overview," http://www.cisco.com/application/pdf/en/us/guest/netsol/ns377/c643/cdccont_0900aecd802c9a4f.pdf, 2006.
Sancho et al.; "Analyzing the Influence of Virtual Lanes on the Performance on Infiniband Networks"; 2002; IEEE Proceeding of the International Parallel and Disctributed processing Symposium (IPDPS'02); pp. 1-10.
F. Kamoun, et al., "Analysis of Shared Finite Storage in a Computer Network Node Environment Under General Traffic Conditions", IEEE Transactions on Communications, Jul. 1990.
A.K. Choudry, et al., "Dynamic Queue Length Thresholds for Shared-Memory Packet Switches", IEEE/ACM Transactions on Networking, Apr. 1998.
A.K. Choudry, et al., "A New Buffer Management Scheme for Hierarchical Shared Memory Switches", IEEE/ACM Transactions on Networking, 26 pp., 1997.
J. Mandavi, et al., "IPPM Metrics for Measuring Connectivity", RFC 2678, pp. 1-9, Sep. 1999.
J. Postel, "Internet Control Message Protocol, DARPA Internet Program Protocol Specification", RFC 792, pp. 1-15, Sep. 1981.
Wei Cao Huawei Technologies: "IEEE 802.1ah Mode for Ethernet Over MPLS; draft-cao-pwe3-801-1ah-00.txt" IETF Standard-Working-Draft, Internet Engineering Task Force, IETF, CH, Oct. 16, 2006, XP015047518 ISSN: 000-0004.
International Search Report and Written Opinion, dated Sep. 21, 2006, from PCT/US05/37069.
International Search Report and Written Opinion, dated Oct. 16, 2006, from PCT/US05/37765.
International Search Report and Written Opinion, dated Nov. 1, 2006, from PCT/US05/36700.
International Search Report and Written Opinion, dated Jan. 16, 2007, from PCT/US05/37239.
International Search Report and Written Opinion, dated Feb. 20, 2007, from PCT/US05/37651.
International Search Report and Written Opinion, dated Sep. 27, 2007, from PCT/US06/38858.
International Search Report and Written Opinion, dated May 23, 2008, from PCT/US08/051986.
International Search Report and Written Opinion, dated Jun. 4, 2008, PCT/US2007/066027.
International Search Report and Written Opinion, dated Oct. 15, 2008, from PCT/US08/069154.
CN Office Action mailed Jul. 31, 2009, in Chinese Application No. 200580034647.5.
CN Second Office Action mailed Feb. 5, 2010, in Chinese Application No. 200580034647.5.
CN Office Action mailed Aug. 8, 2008, in Chinese Application No. 200580035946.
CN Second Office Action mailed Feb. 27, 2009, in Chinese Application No. 200580035946.
CN Office Action mailed Jul. 18, 2008, in Chinese Application No. 200580034646.0.
CN Second Office Action mailed Jan. 15, 2010, in Chinese Application No. 200580034646.0.
CN Office Action mailed Apr. 3, 2009, in Chinese Application No. 200680032204.
EPO Extended Search Report mailed Jul. 16, 2009, in EP Application No. 05810244.3.
EPO Office Action mailed Oct. 1, 2009, in EP Application No. 05810244.3.
EPO Extended Search Report mailed Jul. 13, 2009, in EP Application No. 05810800.2.
EPO Office Action mailed Oct. 19, 2009, in EP Application No. 05810800.2.
EPO Search Report mailed Mar. 19, 2010, in EP Application No. 08728248.9.
U.S. Appl. No. 10/777,886, entitled "End-to-End Congestion Control", filed Feb. 11, 2004.
U.S. Appl. No. 60/621,396, filed Oct. 22, 2004.
US Office Action mailed Mar. 31, 2008 in related U.S. Appl. No. 11/084,587.
US Office Action mailed Oct. 28, 2008 in related U.S. Appl. No. 11/084,587.
US Office Action mailed Apr. 22, 2009 in related U.S. Appl. No. 11/084,587.
US Office Action mailed Nov. 23, 2009 in related U.S. Appl. No. 11/084,587.
US Office Action mailed Jan. 30, 2008 in related U.S. Appl. No. 11/078,992.
US Final Office Action mailed Jul. 11, 2008 in related U.S. Appl. No. 11/078,992.
US Office Action mailed Oct. 23, 2008 in related U.S. Appl. No. 11/078,992.

US Notice of Allowance mailed Mar. 23, 2009 in related U.S. Appl. No. 11/078,992.
US Office Action mailed Jul. 3, 2008 in related U.S. Appl. No. 11/400,671.
US Final Office Action mailed Mar. 17, 2009 in related U.S. Appl. No. 11/400,671.
US Office Action mailed Jun. 22, 2009 in related U.S. Appl. No. 11/400,671.
US Office Action mailed Dec. 9, 2009 in related U.S. Appl. No. 11/400,671.
US Office Action mailed Feb. 21, 2008 in related U.S. Appl. No. 11/094,877.
US Office Action mailed Jul. 28, 2008 in related U.S. Appl. No. 11/094,877.
US Final Office Action mailed Dec. 10, 2008 in related U.S. Appl. No. 11/094,877.
US Office Action mailed Apr. 7, 2009 in related U.S. Appl. No. 11/094,877.
US Office Action mailed Nov. 4, 2009 in related U.S. Appl. No. 11/094,877.
US Notice of Allowance mailed Apr. 23, 2010 in related U.S. Appl. No. 11/094,877.
US Office Action mailed May 29, 2008 in related U.S. Appl. No. 11/155,388.
US Final Office Action mailed Sep. 15, 2008 in related U.S. Appl. No. 11/155,388.
US Notice of Allowance mailed May 29, 2009 in related U.S. Appl. No. 11/155,388.
US Notice of Allowance mailed Jul. 17, 2009 in related U.S. Appl. No. 11/155,388.
US Office Action mailed May 14, 2009 in related U.S. Appl. No. 11/248,933.
US Final Office Action mailed Dec. 28, 2009 in related U.S. Appl. No. 11/248,933.
US Office Action mailed Apr. 15, 2009 in related U.S. Appl. No. 11/670,544.
US Final Office Action mailed Oct. 22, 2009 in related U.S. Appl. No. 11/670,544.
US Office Action mailed Oct. 19, 2009 in related U.S. Appl. No. 11/825,631.
US Office Action mailed Apr. 28, 2010 in related U.S. Appl. No. 11/825,631.
US Office Action mailed Oct. 19, 2009 in related U.S. Appl. No. 11/842,866.
US Final Office Action mailed Apr. 2, 2010 in related U.S. Appl. No. 11/842,866.

* cited by examiner

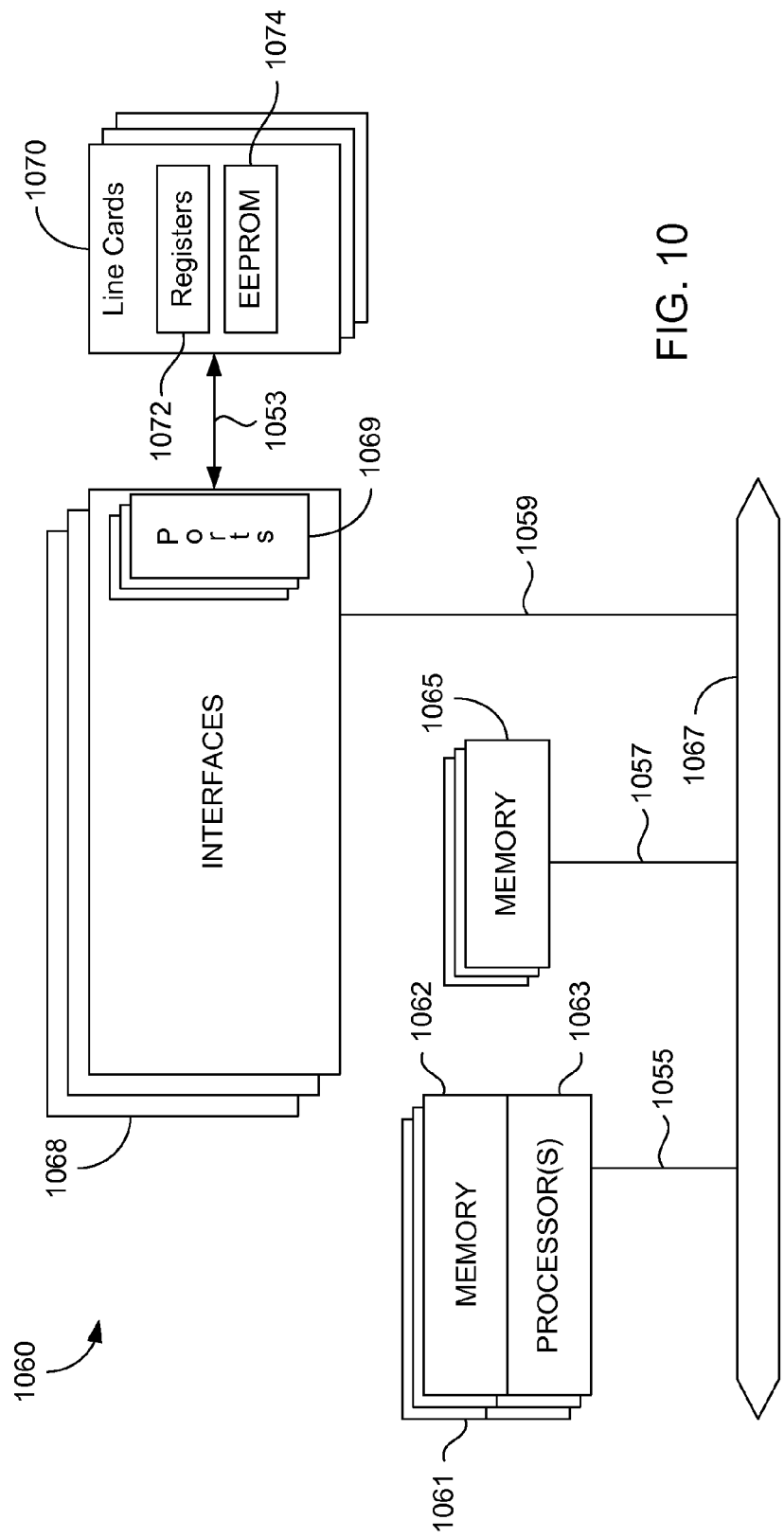

FORWARDING TABLE REDUCTION AND MULTIPATH NETWORK FORWARDING

CROSS-REFERENCE TO RELATED APPLICATIONS

This application claims priority to and is a continuation of U.S. application Ser. No. 11/152,991, entitled "Forwarding Table Reduction and Multipath Network Forwarding," by Kreeger et al, filed on Jun. 14, 2005, which is hereby incorporated by reference in its entirety for all purposes and which claims priority to U.S. Provisional Application No. 60/621,396, entitled "FC Over Ethernet" and filed on Oct. 22, 2004, which is hereby incorporated by reference in its entirety. This application is related to U.S. patent application Ser. No. 11/078,992, entitled "Fibre Channel Over Ethernet" and filed on Mar. 10, 2005, to U.S. patent application Ser. No. 11/084,587, entitled "Ethernet Extension for the Data Center" and filed on Mar. 18, 2005 and to U.S. patent application Ser. No. 11/094,877, entitled "Network Device Architecture for Consolidating Input/Output and Reducing Latency" and filed on Mar. 30, 2005 (collectively, the "Cross-Referenced Applications"), all of which are hereby incorporated by reference in their entirety.

BACKGROUND OF THE INVENTION

FIG. 1 depicts simple network 100 that includes layer 2 Ethernet switches (or IEEE 802.1D bridges) 101, 102 and 103. According to the Spanning Tree Protocol ("STP"), one of the devices of network 100 (in this example, device 102) will be designated as the "root" according to various criteria. For example, a root device may be chosen because it is the closest to the center of a network.

According to STP, root device 102 is the root of a loop-less tree topology that spans all bridges in the network. This topology will not permit traffic to flow on certain links (e.g., link 104), in order to prevent loops and to allow the network devices to do the learning required for proper forwarding of packets. Information is passed between the bridges using the STP so that each bridge can independently decide which port(s) to block to form the tree topology. In this topology, bridge 103 will block its port 109 to break the loop—based on the fact that bridge 102 is the root bridge.

(Although these terms can have different meanings when used by those of skill in the art, the terms "packet" and "frame" will sometimes be used interchangeably herein.) For example, if no learning has yet taken place, when host A first sends frame 110 to host C, switch 101 will receive the frame from A and flood all non-blocked ports. When switch 102 receives frame 110 on port 107, switch 102 learns that A is in the direction of port 107 and will flood to all non-blocked ports except port 107. Similarly, switch 103 will receive frame 110 on port 108 and will learn that A is in the direction of port 108.

Although spanning tree protocol provides for the orderly flow of packets, it does not allow for all links in the network to be used. However, blocking links serves useful purposes. Looping is probably the biggest problem solved by blocking ports to create a tree topology. For example, if link 104 were not blocked, frames would loop both clockwise and counter-clockwise between devices 101, 102 and 103. If link 104 had not been blocked, switch 103 could receive frames from A on port 109 and would then learn that A is in the direction of 109. This change in learning would repeat and therefore frames would sometimes be forwarded to A via ports 108 and sometimes via port 109. Moreover, packets could arrive out of order, because later-transmitted packets could take a shorter path (link 104) and arrive before earlier-transmitted packets via links 105 and 106.

Moreover, current forwarding techniques require increasingly larger (and consequently more expensive) memories dedicated to forwarding tables. Referring again to FIG. 1, a blade server is attached to port 112: blade switch 115 has 16 attached blades 120, each of which acts as a server in this example. Each device in a network, including each blade in a blade server, has a globally unique 48-bit media access control ("MAC") address. Blade servers are becoming increasingly common and are adding significant numbers of MAC addresses to a network.

Moreover, in the near future it may become commonplace for a single physical server to act as a plurality of virtual machines. In this example, each of servers 120 acts as 16 virtual machines and therefore each requires 16 MAC addresses. This makes a total of 256 MAC addresses that are required for the devices attached to blade switch 115, each of which will be sending and receiving frames via port 112. If switch 103 is a 256-port switch, it is conceivable that each port may have an attached device with a comparable number of MAC addresses. This means that over 65,000 ($256^2$=65,536) MAC addresses could be associated with the ports of a single switch. If switches 101 and 103 each had over 65,000 associated MAC addresses, the forwarding table of root switch 102 would need to store over 130,000 48-bit MAC addresses merely for two switches. Therefore, as increasing numbers of physical and virtual devices are deployed in networks, forwarding tables are becoming larger and the associated storage devices are requiring greater capacity and becoming more expensive.

It would be desirable to address at least some shortcomings of the prior art. For example, it would be desirable to use the links that would ordinarily be blocked according to the spanning tree protocol. Moreover, it would be desirable to improve currently-deployed forwarding methods and devices so that smaller forwarding tables and associated memories can be deployed.

SUMMARY OF THE INVENTION

The present invention provides increased usage of network links and allows for the use of smaller forwarding tables and consequently smaller associated memories. According to some aspects of the invention, a combination of STP and Multipath methods are implemented in a network. In some such aspects of the invention, frames are forwarded between switches not only according to MAC addresses, but also according to hierarchical addresses that may include switch IDs and/or local IDs. Switch IDs do not need to be globally unique, but are unique within a particular network. Local IDs are unique within a particular switch. Some preferred implementations allow frames to be transported across the network without changing the ordering of the frames to devices requiring in-order delivery.

In some preferred implementations of the invention, core switches do not need to learn MAC addresses of all host devices attached to the network. Instead, core switches need only learn the switch IDs of each core switch and each edge switch, and the appropriate exit port(s) corresponding to each switch. In such implementations, an edge switch needs to know the MAC address of each device attached to that edge switch (along with the attached port's Local ID), the MAC address of each remote device that is in communication with an attached device (along with its Switch ID and Local ID)

and the Switch ID of every other switch in the network (along with the appropriate exit port(s) to reach it).

Some aspects of the invention provide a method of forwarding frames in a network. The method includes these steps: populating a switch forwarding table ("SFT") of each active core switch and edge switch in a network with the switch address of every other active core switch and edge switch in the network; populating a first local media access control ("MAC") table with MAC addresses of local host devices attached to a first port of a first edge switch; populating a first remote MAC table with remote addresses of remote host devices that are attached to other ports and that have been communicating with at least one of the local host devices; receiving a frame from a first host device; and determining whether a destination MAC address indicated in the frame is included in first remote MAC table. The remote addresses may include MAC addresses and hierarchical addresses.

The SFTs are preferably populated according to a protocol that determines least cost and equal cost paths. Preferably, SFT entries are not aged out. Some aspects of the method involve depopulating SFTs in response to topology change notifications. The topology change notifications may be in the form of negative MAC notification ("MN") frames, which are described in detail herein.

When it is determined that the destination MAC address indicated in the frame is not included in the first remote MAC table, the method may also include the steps of encapsulating the frame with the first port's hierarchical address to create an encapsulated frame and flooding the encapsulated frame according to the spanning tree protocol ("STP"). The method may also include the steps of receiving, by a second edge switch, the encapsulated frame and determining whether the second edge switch has a second local MAC table that includes the destination MAC address.

If it is determined that the second edge switch has a second local MAC table that includes the destination MAC address, the method may include these steps: adding the source MAC address and the hierarchical address of the encapsulated frame to a second remote MAC table of the second edge switch; removing the hierarchical address from the encapsulated frame to form a decapsulated frame; and forwarding the decapsulated frame to a second host device attached to a second port and having the destination MAC address.

The method may include the step of indicating whether the first port needs to receive frames in order. Some such aspects of the invention also include the steps of receiving, by a core switch, the encapsulated packet and updating the core switch's SFT to indicate that frames should be forwarded to the first edge switch via STP. The method may involve returning a second frame from the second host device to the first host device via a least cost path, the second frame indicating the first host's MAC address, the second host's MAC address and the first port's hierarchical address.

The method may also include these steps: returning a MAC notification frame from the second port to the first port via a least cost path and updating the first remote MAC table to include the second host's MAC address and the hierarchical address of the second port. The MAC notification frame can include a hierarchical address of the second port, the first host's MAC address and the second host's MAC address. The method may also include the step of sending a MAC notification frame from the first port to the second port indicating that the first port needs to receive frames in order.

All of the foregoing methods, along with other methods of the present invention, may be implemented by software, firmware and/or hardware. For example, the methods of the present invention may be implemented by computer programs embodied in machine-readable media. Some aspects of the invention can be implemented by individual network devices (or portions thereof, such as individual line cards) and other aspects of the invention can be implemented by multiple devices of a network.

BRIEF DESCRIPTION OF THE DRAWINGS

The invention may best be understood by reference to the following description taken in conjunction with the accompanying drawings, which are illustrative of specific implementations of the present invention.

FIG. 10 illustrates a network device that could be configured according to some aspects of the invention.

DETAILED DESCRIPTION OF SOME PREFERRED EMBODIMENTS

Figure 1:
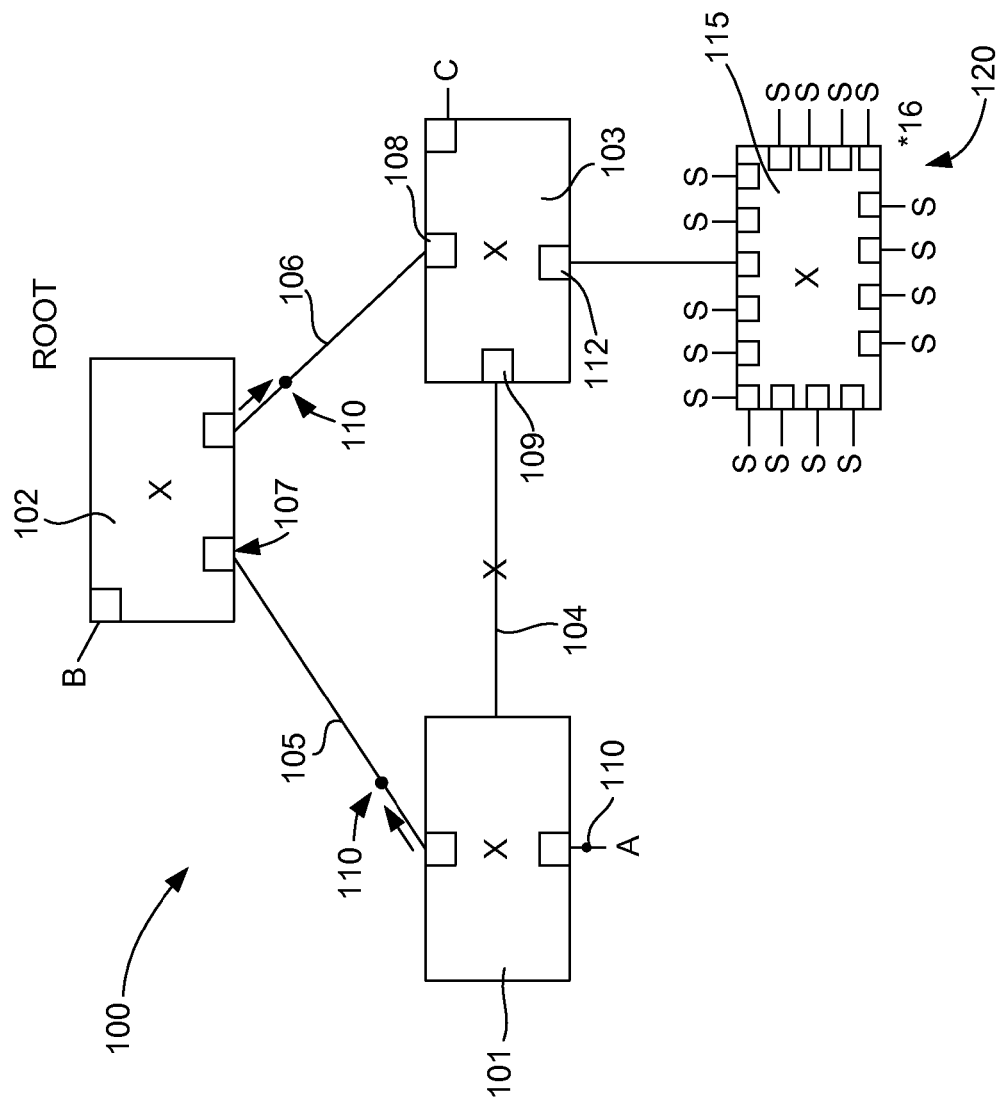
FIG. 1 is a simplified network diagram that illustrates, inter alia, the use of Spanning Tree Protocol.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Some implementations of the invention are made in the context of Data Center Ethernet ("DCE"), e.g., as described in detail in the Cross-Referenced Applications. As such, many implementations of the invention involve networks that are composed, at least in part, of DCE switches. Similarly, the frames that are used to implement many aspects of the present invention are DCE frames. However, the present invention is not limited to the DCE context. For example, the present invention may advantageously be used in networks that have no Fibre Channel component.

Accordingly, the present invention provides advantageous methods for implementing DCE networks and other networks, such as Ethernets. The invention allows most frames to be forwarded according to least cost path ("LCP"), which will sometimes be used synonymously herein with the term equal cost path ("ECP") or equal cost multipath ("ECMP"). According to some aspects of the invention, a combination of STP and LCP methods are implemented in a network. The invention allows increased usage of network links, as compared to methods that solely use conventional STP.

In some such aspects of the invention, frames are forwarded not only according to MAC addresses, but also according to "hierarchical addressing," which will primarily be discussed herein with reference to switch IDs and local IDs. Switch IDs do not need to be globally unique, but should be unique within a particular network. Local IDs are unique within a particular switch. In preferred implementations, hierarchical addresses are added by an edge switch after a frame is received from an attached host device and are stripped out by an edge switch before a frame is forwarded to an attached host device.

In some preferred implementations of the invention, core switches do not need to learn MAC addresses of all host devices attached to the network. Instead, core switches need only learn the address (e.g., the switch ID) of each core switch and each edge switch, and the appropriate exit port(s) corresponding to the ECP to each switch. In such implementations, an edge switch needs to know the addresses of each device attached to that edge switch, the address of each device that is in communication with an attached device and the address of every other switch in the network. Preferably, the local ID of a destination is only evaluated after a frame has reached the destination edge switch. Accordingly, the invention allows for the use of relatively smaller forwarding tables than were heretofore possible and consequently allows network devices to have smaller associated memories.

Figure 2:
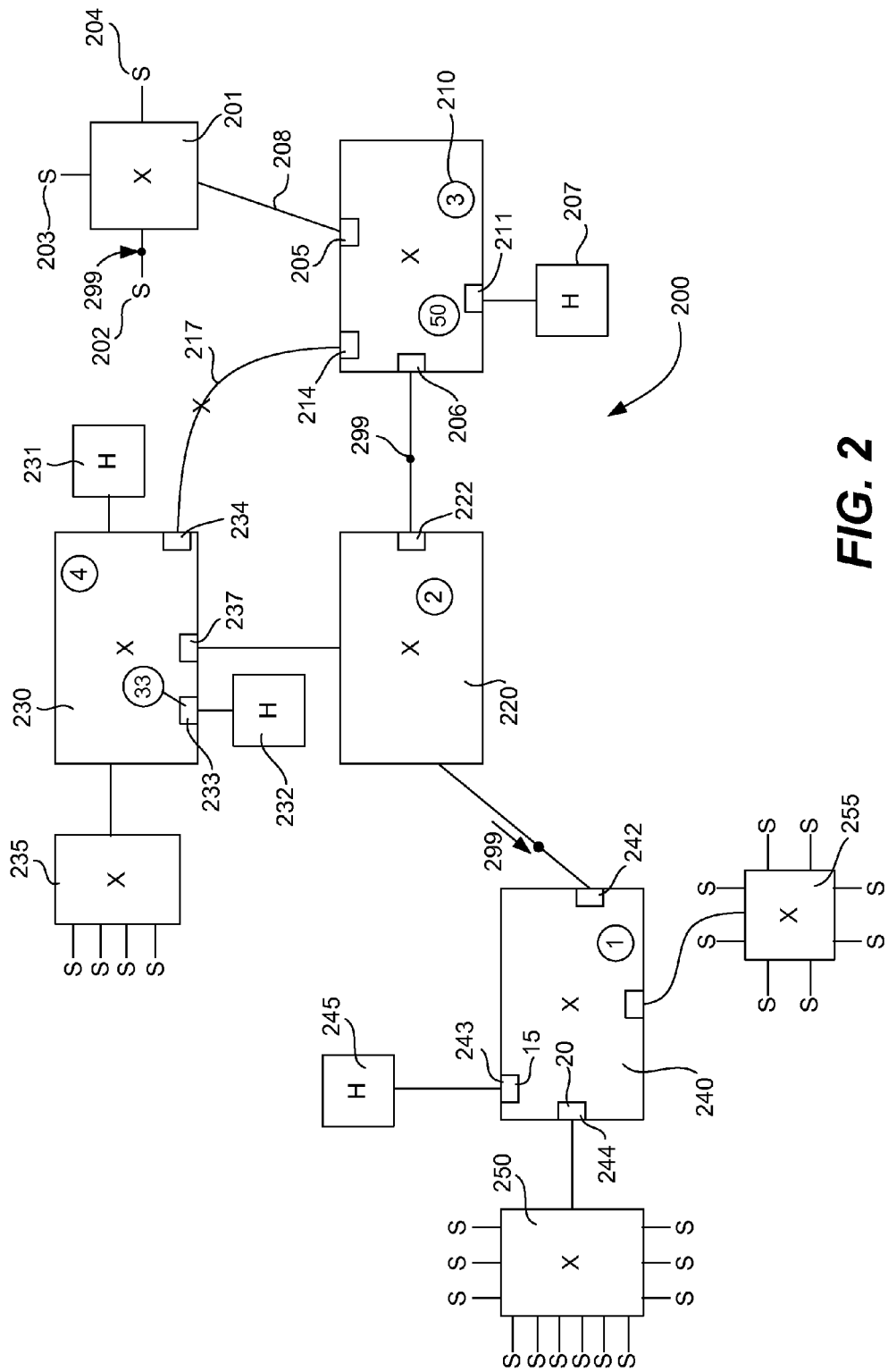
FIG. 2 illustrates one example of a simplified network that includes devices configured to perform some hierarchical addressing methods of the invention.

FIG. 2 illustrates one example of a simplified network that includes devices configured to perform some hierarchical addressing methods of the invention. Network 200 is a DCE network in this example. However, in alternative implementations of the invention, network 200 could be another type of network, such as an Ethernet. Network 200 includes edge switches 210, 230 and 240, as well as various attached devices. Switch 220 is a core switch. Switch 201 connects servers 202, 203 and 204, and is in communication with edge switch 210 via port 205. Host device 207 is also attached to edge switch 210. Host devices 231 and 232, as well as blade switch 235, are attached to edge switch 230. Host device 245, as well as blade switches 250 and 255, are attached to edge switch 240.

It will be appreciated by those of skill in the art that such blade switches and the associated blades are often collectively referred to as "blade servers." Moreover, those of skill in the art will also realize that there is normally more than one blade switch deployed in each blade server. However, for the sake of simplicity, such redundant switches and connections are not illustrated herein.

In addition to MAC addresses, hierarchical addresses are used to forward frames in network 200 according to the present invention. According to some preferred implementations of the invention, a hierarchical address can include a switch ID and a local ID. Although such IDs will often be described as numbers, these IDs could be assigned in any convenient manner, e.g. as symbols, combinations of symbols and numbers, etc. Some examples of such hierarchical addresses and their uses will now be described.

According to some implementations of the invention, each core switch and edge switch in network 200 has a switch ID: edge switch 210 has switch ID "3," edge switch 230 has switch ID "4," edge switch 240 has switch ID "1" and core switch 220 has switch ID "2." Each switch ID is locally significant and should be unique within network 200, but switch IDs need not be globally unique. However, there are a limited number of switch IDs available in a network. According to some implementations of the invention, switch IDs are 12 bits wide, but switch ID numbers could be any convenient width. For example, one alternative implementation features 8-bit switch IDs and another has 16-bit switch IDs. Nonetheless, it is preferable that a switch ID is expressed by a relatively small number of bits (e.g., smaller than the 48 bits assigned to MAC addresses), so that a relatively smaller memory is required.

Each switch of network 200 also preferably assigns local IDs, which have meaning within a particular switch and need only be unique within one switch. In other words, according to some implementations of the invention the same local ID may be used in switch 210 and switch 240, but the local ID can have a different meaning in each case. In other implementations of the invention, local IDs are unique within a particular network. Local IDs may be used, for example, to identify individual network device components, such as switch ports or line cards. According to some implementations of the invention, local IDs are 14 bits wide, but local IDs could be any convenient width.

In some preferred implementations, a local ID is assigned to each port of an edge switch. For example, port 243 and port 244 will each have a single local ID, even though port 243 is connected to device host 245, having a single MAC address, and port 244 has is connected to blade switch 240, having multiple MAC addresses. In such implementations, the maximum number of local IDs is controlled by the number of ports of the switch. For example, if a switch has 256 ports, it would require only 256 local IDs, despite the fact that many more than 256 MAC addresses may be assigned to devices attached to that switch. In alternative implementations, a local ID could be assigned to a line card, a processor (such as an ASIC), etc.

As port 205 receives frames from each of servers 202, 203 and 204, port 205 learns that devices having the MAC addresses of servers 202, 203 and 204 are in the direction of link 208. Each port of an edge switch populates a local MAC table ("LMT"), which includes a list of all MAC addresses of devices that are reachable via that port. For example, port 205 would populate a local MAC table with the MAC addresses of switch 201 and servers 202, 203 and 204.

Each device in a network will not be talking to every other device in the network. For example, it has been observed that a server normally only communicates with a few thousand other servers. By populating a forwarding table with addresses for only a subset of all devices on the network, a great savings of memory space may be attained.

Therefore, each port of an edge switch also populates at least one remote MAC table ("RMT") per switch with the addresses of remote devices with which attached local devices have communicated or want to communicate. Preferably, an RMT makes a correspondence between the MAC addresses and the hierarchical addresses of the network port such devices are attached to. In some implementations, there will be an RMT for each line card. In alternative implementations of the invention, an RMT may be shared by all ports of a switch.

Figure 3A:
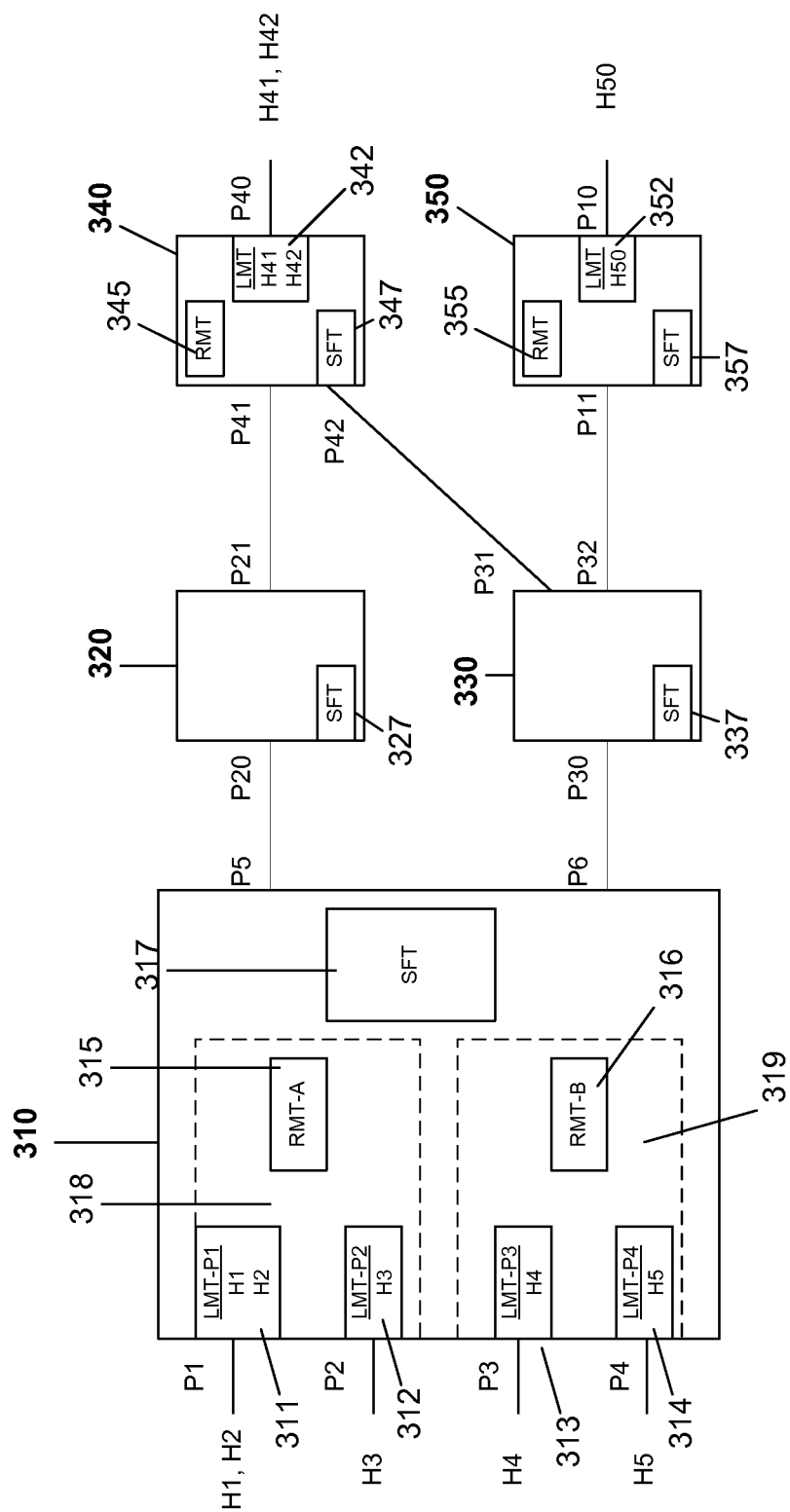
FIGS. 3A-3C are block diagrams that include core switches, edge switches and associated forwarding tables that could be used according to some aspects of the invention.

LMTs, RMTs and switch forwarding tables ("SFTs," a/k/a "switch ID tables") will now be discussed in more detail with reference to FIGS. 3A, 3B and 3C. FIG. 3A is a block diagram that includes switches 310, 320, 330, 340 and 350, and their associated forwarding tables. In this example, edge switches 310, 340 and 350 each have multiple LMTs, at least one RMT and an SFT, whereas core switches 320 and 330 have only an SFT.

Accordingly, each core switch and edge switch has an SFT. Except as noted elsewhere herein, SFTs are populated mainly through the use of protocols known in the art, such as the Intermediate System to Intermediate System ("IS-IS") protocol or the Open Shortest Path First ("OSPF") protocol. RFC 2178 contains relevant information and is hereby incorporated by reference. When each core or edge switch comes on line, its topology is advertised among all switches and shortest path computations are made, e.g., according to the Dijkstra algorithm. Except as noted below with respect to "InOrder" bits, etc., this process is not data driven.

Figure 3B:
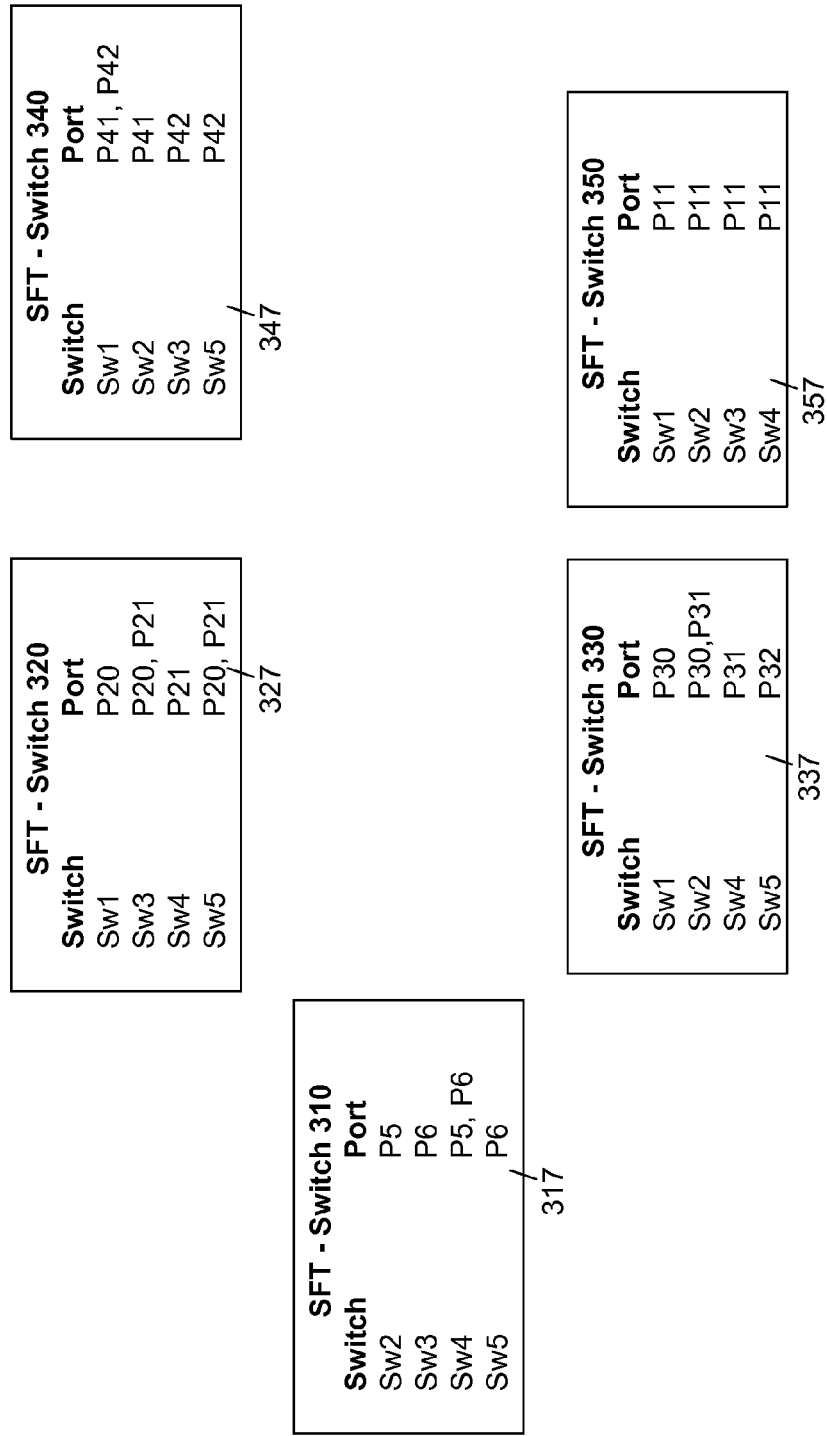
Figure 3C:
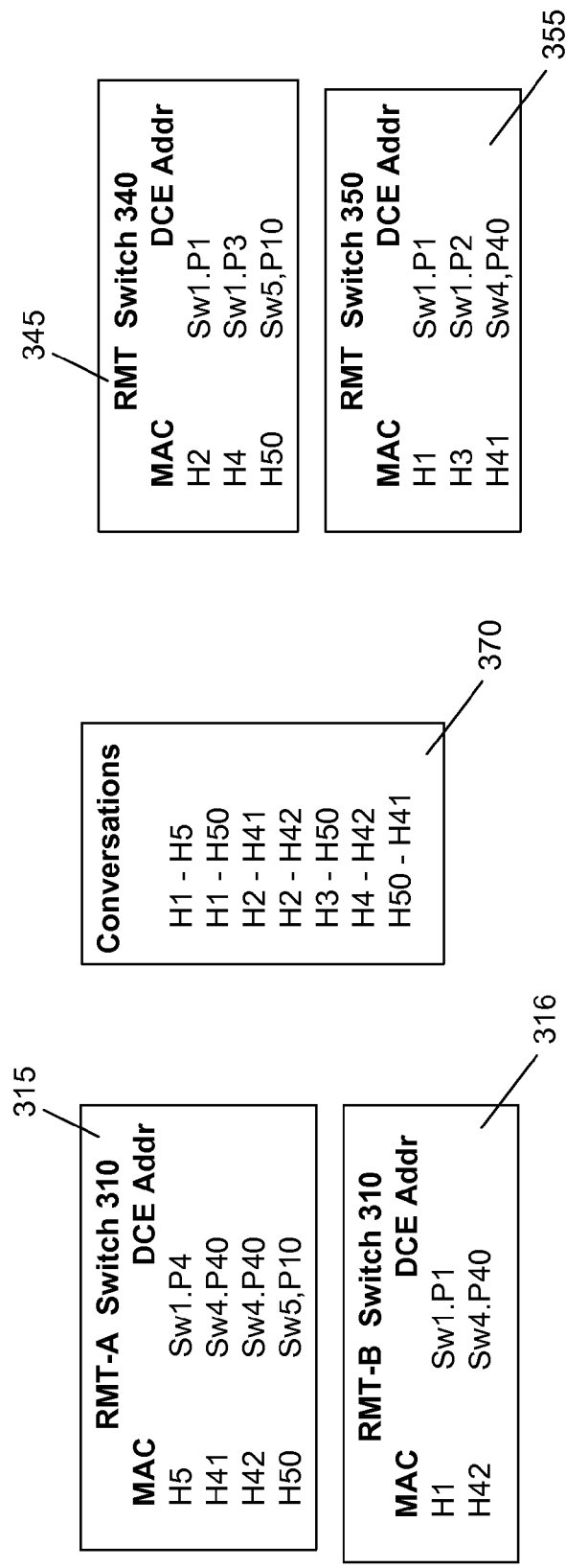

FIG. 3B indicates the contents of SFTs 317, 327, 337, 347 and 357, which correspond to switches 310, 320, 330, 340 and 350, respectively. SFT 317, for example, includes the address of each other core or edge switch in the network. In this example, each such address is in the form of a switch ID. However, in alternative implementations, these addresses could be in the form of a MAC address. The switch ID of switch 310 itself is "1," but switch 1 does not need to be indicated on its own SFT 317. Therefore, SFT 317 includes only the switch IDs for switch 320 ("Sw2"), switch 330 ("Sw3"), switch 340 ("Sw4") and switch 350 ("Sw5").

In addition, SFT 317 indicates the exit port to which frames should be forwarded according to the LCP or ECP to each of the indicated switches. There is a single port corresponding to each of switch IDs Sw2, Sw3 and Sw5, because each port is part of a LCP. For example, there is a clear shortest path between switch 310 and switch 320 ("Sw2") via exit port P5. Therefore, there is only a single port, P5, corresponding with Sw2. However, there are 2 equal-cost paths between switch 310 and switch 340 ("Sw4"). Therefore, port P5 and port P6 are both associated with Sw4.

Referring again to FIG. 3A, it will be observed that edge switches maintain multiple LMTs, preferably one for each port. When the MAC address for each host device in communication with a port of an edge switch is first received, the MAC address will be added to the associated LMT. For example, port P1 has attached host devices H1 and H2. LMT 311 is associated with port P1, so the MAC address of attached host devices H1 and H2 will be added to LMT 311, as shown. LMTs 312, 313, 314, 342 and 352 are populated in a similar fashion.

Each port of an edge switch also populates at least one RMT per switch with the addresses of remote devices with which attached local devices have communicated or want to communicate. Preferably, an RMT makes a correspondence between the MAC addresses and the hierarchical addresses of such remote devices. According to some implementations, RMTs may be shared among multiple ports. For example, ports P1 and P2 are both connected to line card 318 and share RMT 315. Similarly, ports P3 and P4 are both connected to line card 319 and share RMT 316.

As used herein a "remote device" may be a device attached to another edge switch or a device attached to another port of the same edge switch. This point is illustrated by RMTs 315 and 316 of FIG. 3C. Because there has been at least one conversation between host devices H1 and H5, RMT 315 for port P1 includes the MAC address of "remote device" H5 and the associated hierarchical address of port P4, to which remote device H5 is attached (Sw1, P4). Similarly, RMT 316 for port P4 includes the MAC address of remote device H1 and the associated hierarchical address of port P1, to which remote device H1 is attached (Sw1, P1). The population of RMTs will be described in more detail below with reference to FIGS. 4-9.

According to some implementations, each entry in an RMT contains an aging timer. The timer may be reset, e.g., when a unicast frame addressed to an edge port using this RMT is received from a core switch and has a source MAC address corresponding to the RMT entry. If the timer expires, the RMT entry is removed.

Figure 4:
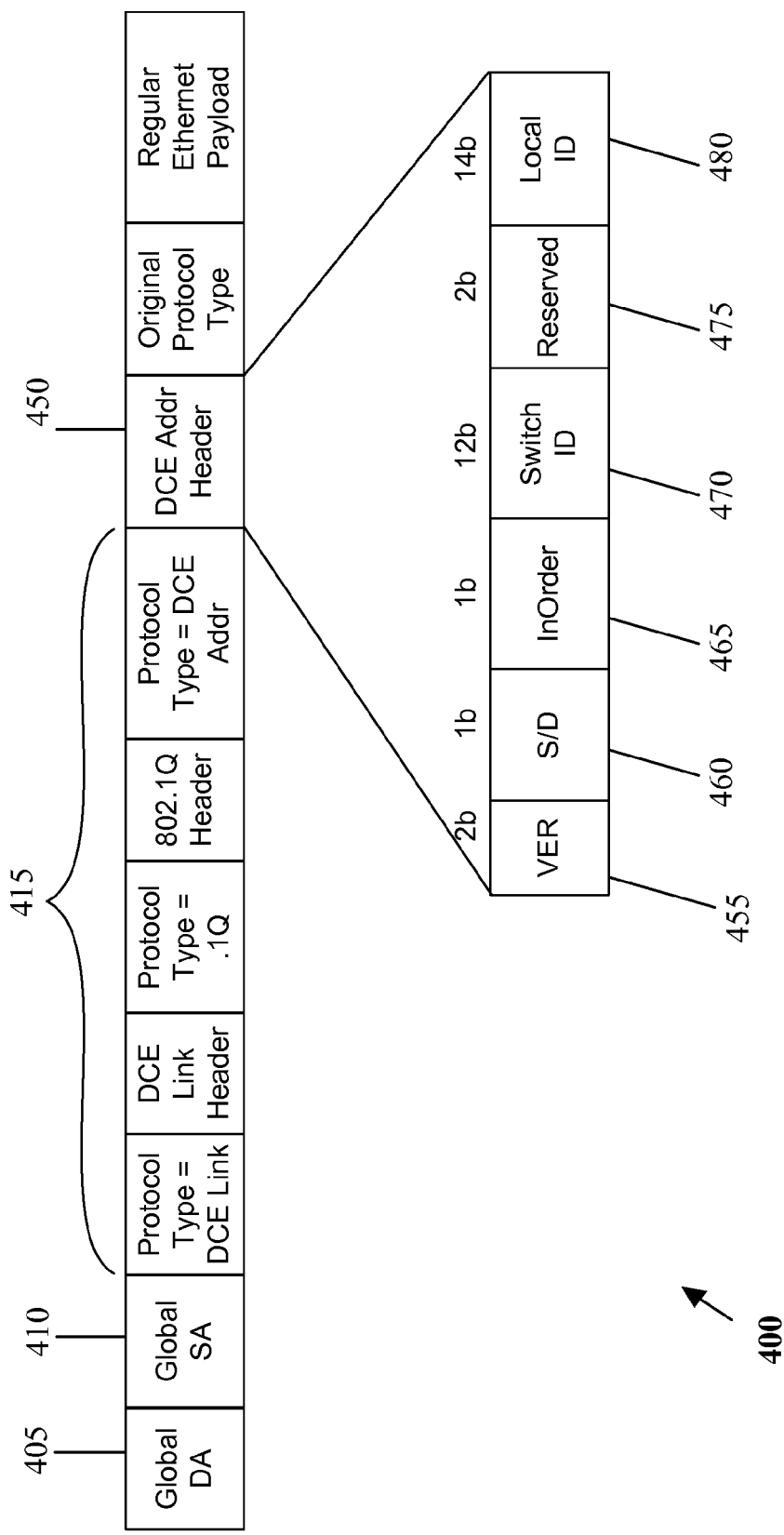
FIG. 4 provides one example of a frame that could be used to implement some aspects of the invention.

FIG. 4 illustrates exemplary frame 400, having an address header according to some aspects of the invention. Those of skill in the art will realize that other such frame formats are within the scope and spirit of the invention, and that the formats shown and described herein are merely illustrative. Global DA field 405 includes the destination MAC address and global SA field 410 includes the source MAC address. The description of fields 415 set forth in the Cross-Referenced Applications is hereby incorporated by reference. However, the contents of address header field 450 (which in this example is called a DCE address header) warrant additional comment.

Version field 455 is a 2-bit field in this example. In this example, it is set to 0 initially, with other values reserved for future changes to the format. Here, the source/destination ("S/D") bit 460 is set to 1 if the hierarchical address is the source port's address or set to 0 if the hierarchical address is the destination port's address.

InOrder bit 465 is used for causing frames to follow the STP instead of the LCP/ECP, to allow for the use of host devices that require strict ordering of frame delivery. The use of InOrder bit 465 will be described in more detail below. Two reserved bits 475 are set to 0 and reserved for future use.

In this example, fields 470 and 480 indicate a two-part hierarchical address. Those of skill in the art will realize that hierarchical addresses could include more or less than two parts. In this example, the 12-bit Switch ID field 470 is an unique value associated with a core switch or an edge switch. The 14-bit Local ID field 480 is unique only within a single switch and is used to direct a frame to the correct egress port. In some implementations, a TTL field may be added to the address header.

Figure 5:
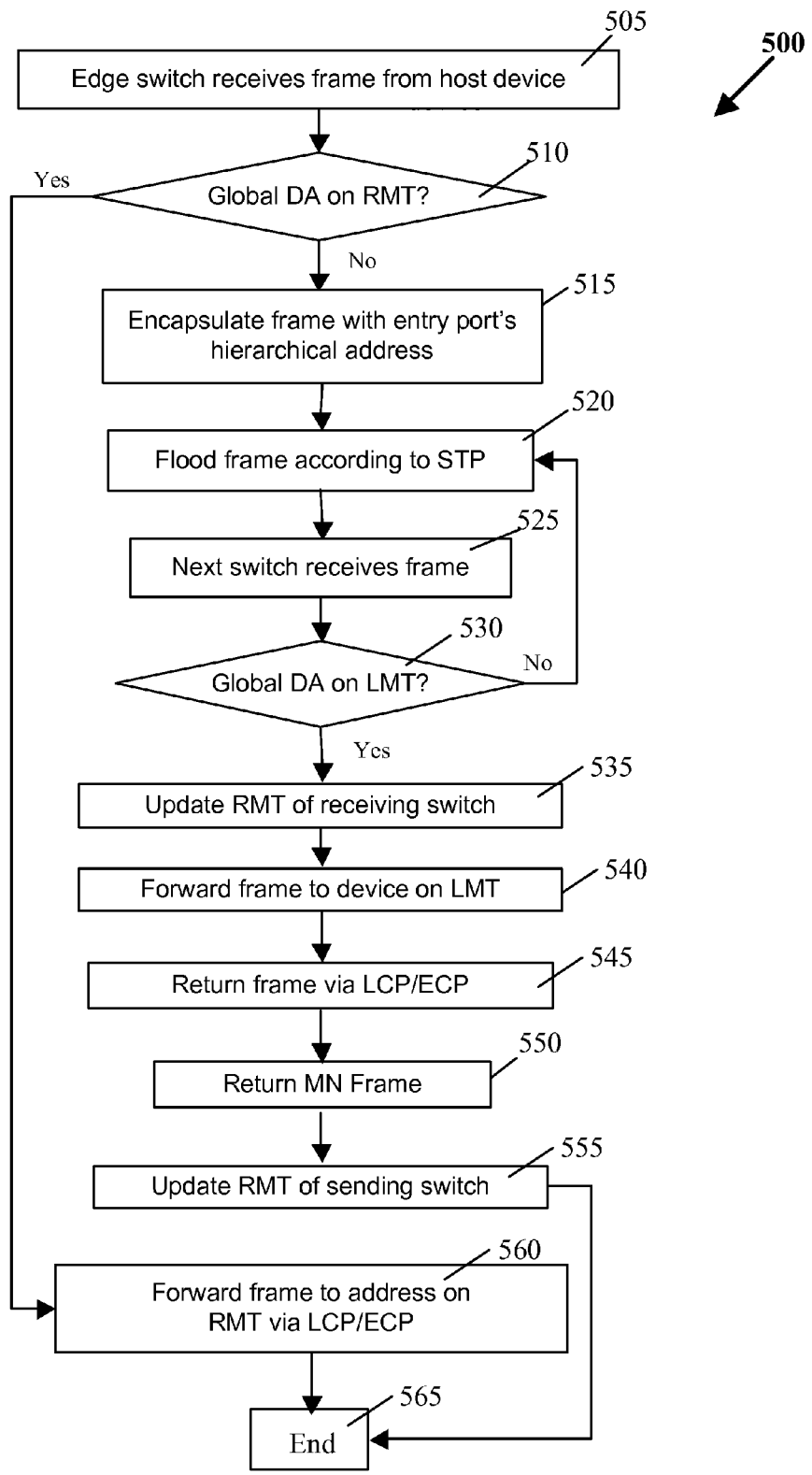
FIG. 5 is a flow chart that outlines a method of the invention.

Method 500 of the invention will now be described with reference to FIG. 5. The steps of method 500 (as well as those of other methods shown and described herein) are not all necessarily performed in the order indicated. Moreover, methods of the invention may include more or fewer steps than are shown.

In step 505, a port of an edge switch receives a frame. In step 510, it is determined whether the destination MAC address is on an RMT that is used by the port. If the destination MAC address is on the RMT, the frame is forwarded to the hierarchical address indicated in the RMT (step 560).

However, in some instances it will be determined in step 510 that the destination MAC address is not on the RMT. Suppose, for example, that port 211 (see FIG. 2) receives a frame from host 207 that is addressed to host 232, a destination that is not in the RMT used by port 211. This could be, e.g., because there has been no previous conversation between hosts 207 and 232 or because a previous RMT entry had an aging timer that expired.

In step 515, a device within switch 210 (e.g., a processor associated with port 211) will encapsulate the frame with the port's hierarchical address. In this example, the switch ID is 3, so switch ID field 470 will indicate "3." Similarly, the local ID of the port is 50, so local ID field 480 will indicate "50." S/D bit field 460 will be set to "1," because the hierarchical address is the source port's address.

In step 520, the frame is then flooded to all ports of switch 210 (except, preferably, the source from which the frame originated) and received by neighboring switches (step 525). The frame is flooded according to a normal Ethernet STP, except that the intermediate switches preferably do not perform the normal type of STP learning. Each switch that receives the frame will determine whether it has an LMT that includes the destination MAC (step 530) and, if not, the switch will flood the frame without any learning. For example, switches 201 and 220 would flood all ports with the frame without performing any learning, because switch 201 has no LMT with the MAC address of host 232 and switch 220 is a core switch that has no LMT.

However, edge port 233 of switch 230 does have the MAC address of host 232 in its LMT. Therefore, edge port 233 would add the hierarchical source address of the frame and the source MAC address indicated in field 410 to edge port 233's RMT. (Step 535.) Edge port 233 would also forward the frame to host 232 (step 540), preferably with the hierarchical address removed: in preferred implementations edge switches add and remove hierarchical address. Host devices do not need to process hierarchical address or even be aware of them.

Edge port 233 can now return a frame to host 207 having a global DA 405 indicating the MAC address of host 207, global SA 410 indicating the MAC address of host 232, switch ID field 470 indicating "3," the switch ID of switch 210 and local ID field 480 indicating "50," the local ID of port 211. (Step 545.) This information may be obtained from the recently-updated RMT of edge port 233. S/D bit field 460 will indicate "0," because the hierarchical address is that of a destination.

The returned frame does not need to follow STP, but instead can be sent according to a least cost path, according to an SFT of switch 230. Accordingly, in this example, the frame could be returned via port 234 and link 217, which was blocked according to STP and not used when the original frame was sent.

When switch 210 receives the returned frame it is inspected by port 214, which determined that the frame includes a hierarchical destination address because S/D bit field 460 indicates "0." Port 214 inspects switch ID field 470 and determines that switch 210 is the destination switch and determines that the destination port is port 211 (local ID=50). Accordingly, port 214 forwards the frame to host 207 via port 211.

However, the returned frame does not indicate the hierarchical source address of host 232, so switch 210 cannot populate an RMT based only upon information in the returned frame. Therefore, according to some implementations of the invention, a special MAC Notification ("MN") frame is returned (step 550) in order to allow switch 210 to update its RMT with the hierarchical source address of host 232. (Step 555.) Thereafter, traffic can continue to flow between host devices 207 and 232 via the shortest path, which is link 217.

MN frames are generated by edge ports towards the core of the network to another edge port. When MN frames are received by the remote edge port, they are preferably processed and consumed: MN frames should not flow out an edge port unless the port is configured to have the hosts terminate the address learning. Any frame carrying the MN header preferably does not have any data payload.

Figure 6:
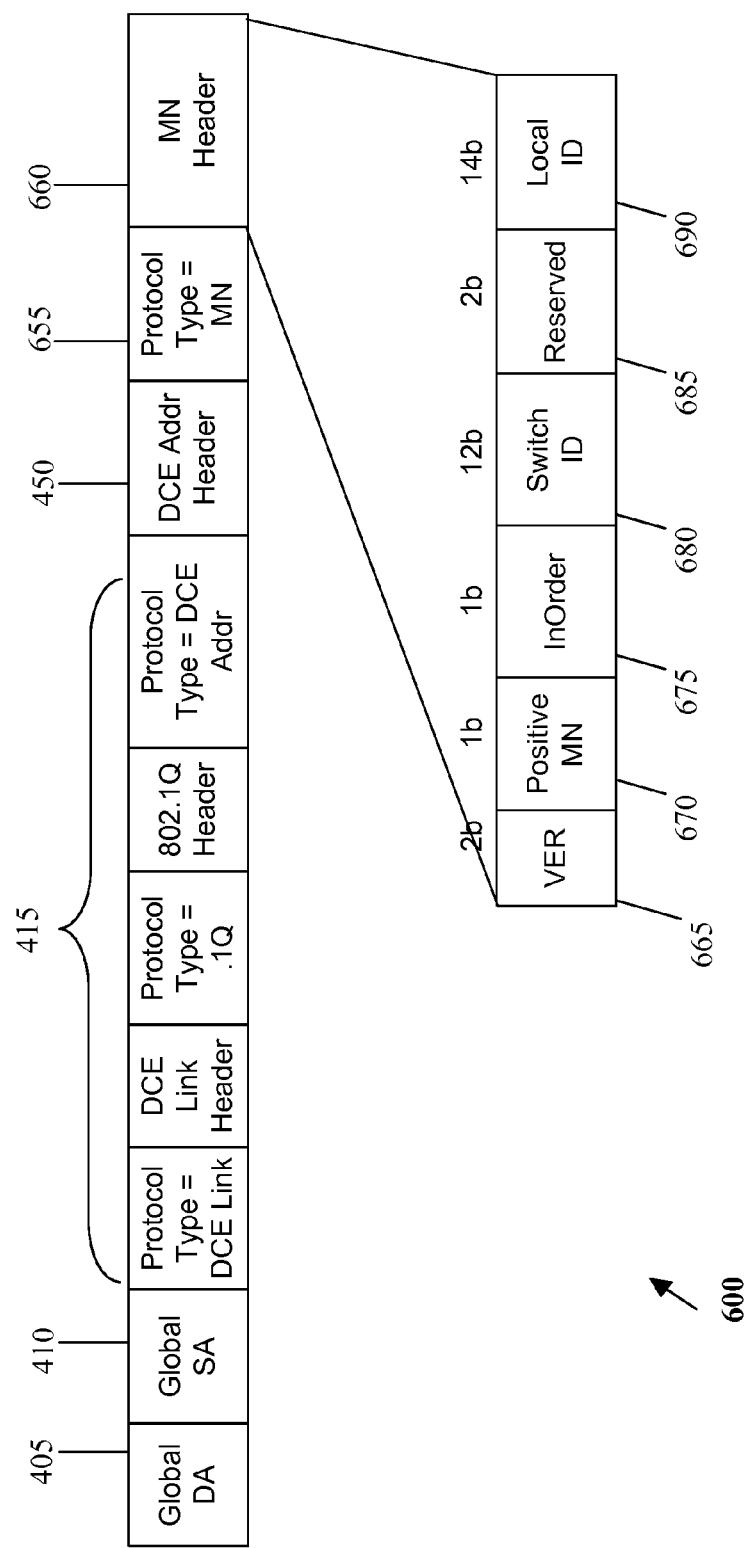
FIG. 6 is an exemplary MAC Notification ("MN") frame that can be used to implement some aspects of the invention.

One exemplary MN frame format is illustrated in FIG. 6. MN frame 600 has many of the same fields as a data frame according to the invention. However, field 655 indicates that MN header 660 follows. Version field 665 is currently set to 0, with other values reserved for future changes to the format.

Positive MN field 665 indicates whether MN frame 600 is a positive or a negative MN frame. In this example, Positive MN field 670 is set to 1 if this is a positive MN frame and is set to 0 for a negative MN frame. Positive MN frames cause an edge port to learn a new hierarchical address mapping and negative MN frames cause an edge port to remove a MAC to hierarchical address mapping. Positive MN frames should be unicast directly to the edge port that needs to learn the address mapping by using the source hierarchical address in a frame from that source, as indicated by switch ID field 470 and local ID field 480 (see FIG. 4) of the data frame containing the hierarchical source address which triggered the positive MN.

Negative MN frames are flooded to the destination(s), e.g., because the frame triggering the negative MN frame generation did not contain a source hierarchical address. In addition, this broadcast will accelerate removal of stale MAC to hierarchical address mappings in all remote edge ports when a host goes away/moves. If a switch goes down, new shortest path computations are made and the SFTs are updated accordingly. However, this does not affect the LMTs or RMTs. If a port goes down (or if an attached host device is disconnected), the port's LMT is purged. In order to notify the other devices in the network of this change, a negative MN is used. If the device is connected to another port in the network, its location must be re-learned and the associated LMT and RMTs must be re-populated.

The InOrder bit 675 is used to indicate that the source of the MN frame requires strict ordering of frame delivery. The 2 reserved bits 685 are now set to 0 and reserved for future use.

Some proprietary (legacy) systems need to receive frames in order. It will be observed that at certain times, frames are being routed according to STP and at other times frames are being routed according to the ECP/LCP. There are certain instances in which frames could arrive out of order, e.g., when changing from STP to LCP. For example, just before the RMT of port 211 is updated to indicate the MAC and hierarchical address of host 232, it is possible that host 207 had just sent a frame to host 232 via a longer path according to STP (via switch 220) and might then send another frame to host 232 via the shorter LCP (link 217), which could arrive out of order.

According to some implementations of the invention, an "InOrder" bit of a data frame (e.g., InOrder bit 465 illustrated in FIG. 4) or an MN frame's DCE Address Header (e.g., inside field 450 illustrated in FIG. 6) is used to cause frames to follow STP instead of LCP in case end hosts require strict ordering of frame delivery. In some such implementations, when a frame indicating a hierarchical source address (e.g., a data frame having S/D bit field 460 set to "1") also has the InOrder bit set, this indicates that the source should receive packets in order. Any device that forwards such a packet will learn that packets should be sent to the switch ID of the originating switch via STP and will update its SFT accordingly based on the port the frame was received on. This is an exception to the general rule that SFTs are not normally updated by "learning," but instead are normally populated prior to the exchange of data frames between switches. If a frame indicating a hierarchical destination address (e.g., a data frame having S/D bit field 460 set to "0") also has the InOrder bit set, this indicates that the frame should be forwarded to its destination according to STP.

Figure 7:
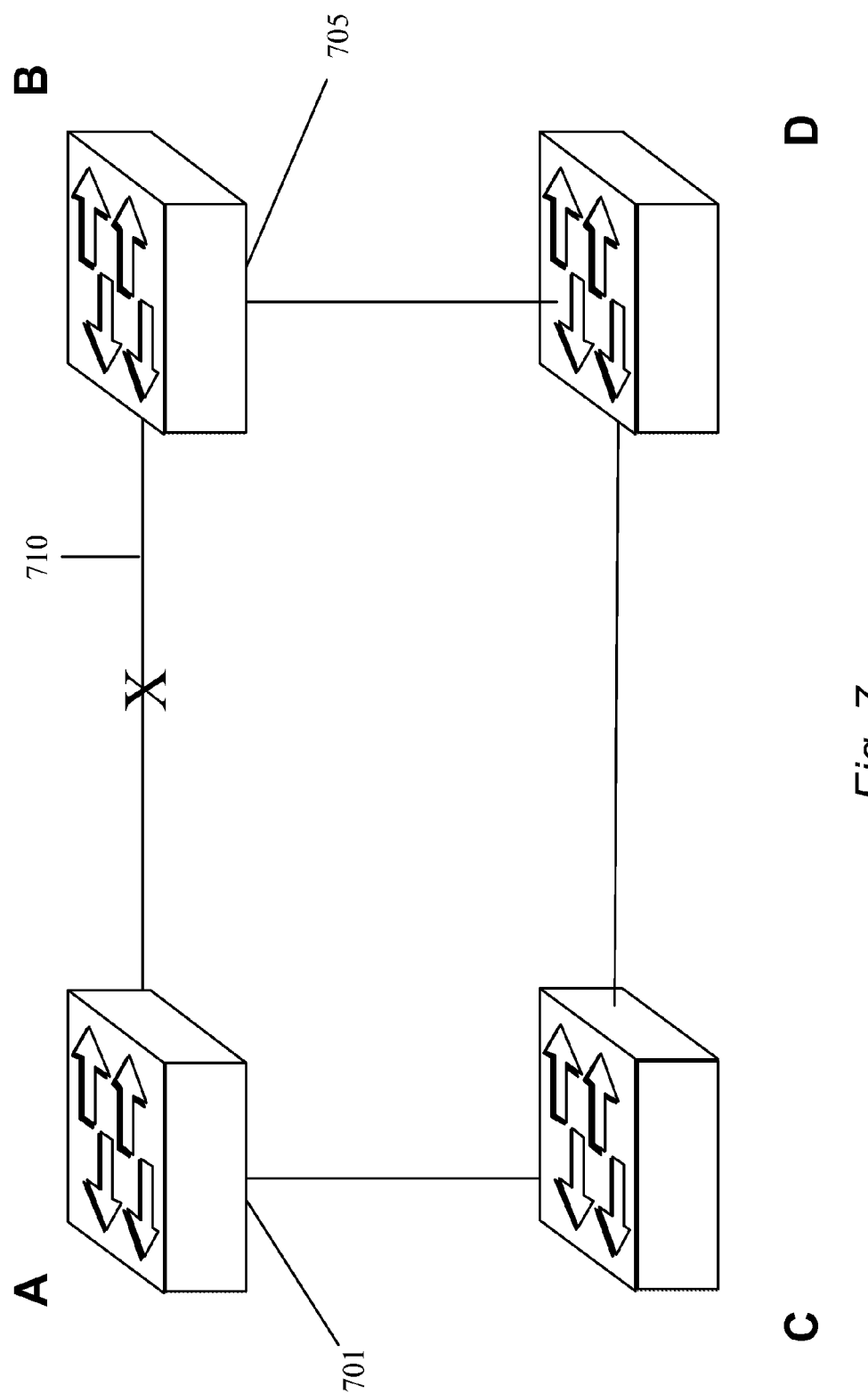
FIG. 7 is a simple network diagram that illustrates some implementations of the invention.
Figure 8:
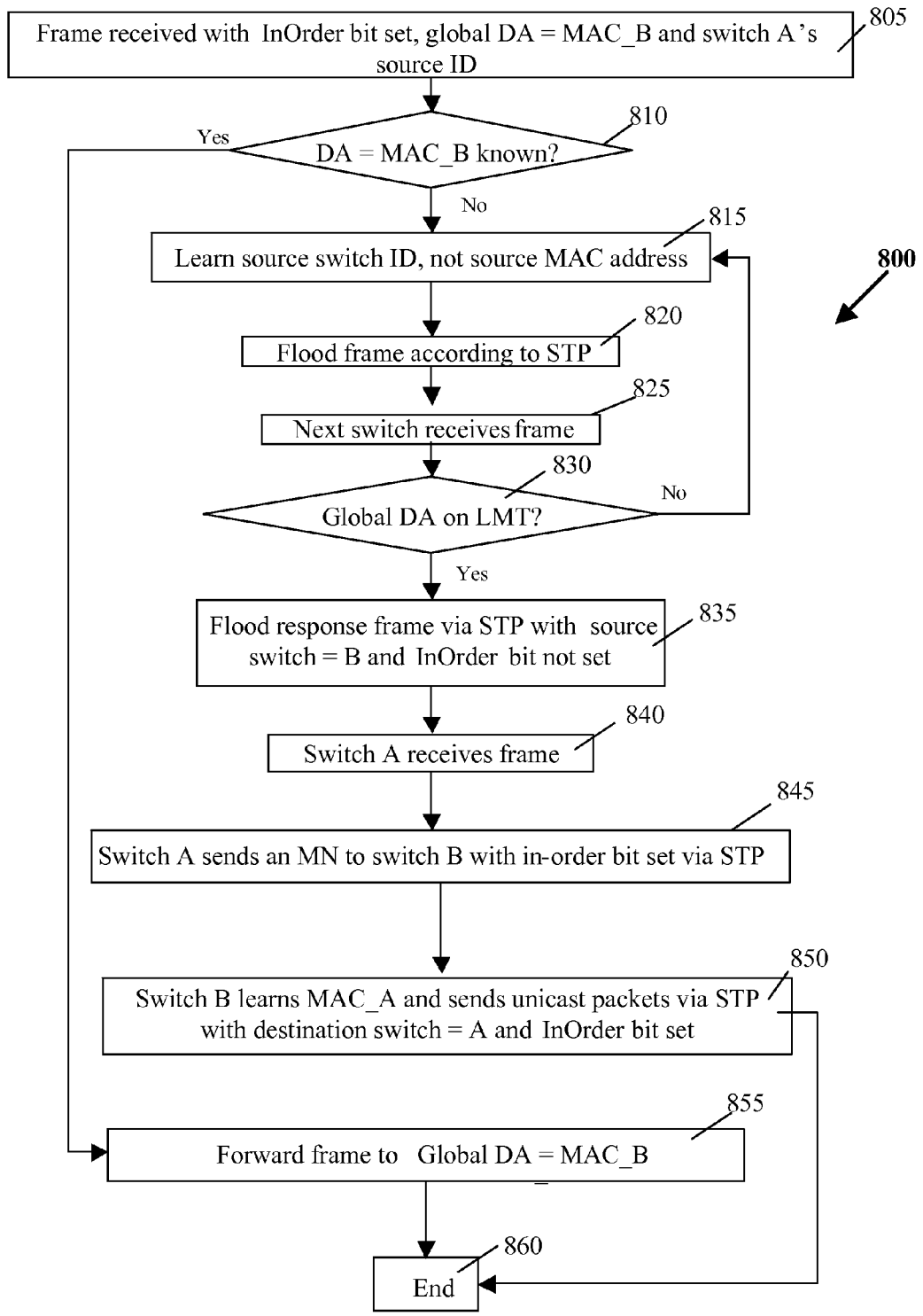
FIG. 8 is a flow chart that outlines some methods of the invention.

Use of the InOrder bit according to one implementation of the invention will now be described with reference to FIGS. 7 and 8. FIG. 7 includes switches A, B, C and D. Port 701 with MAC_A in switch A needs to receive frames in "in-order" mode. Port 705 with MAC_B in switch B is in normal mode;

in other words, port 705 does not need to receive frames in "in-order" mode. Switches C and D are core switches. Link 710 is blocked by STP.

Conventional Ethernet switches learn the Source MAC addresses and age the entries out using an aging timer. Traffic that flows toward a learned source MAC address uses the above entry learned from the source MAC. The aging timer ensures that a huge number of stale entries corresponding to end-host MAC addresses do not remain in the forwarding tables. Please note that bidirectional traffic keeps the learned entries alive and in the absence of bidirectional traffic classical Ethernet switches restore to flooding.

According to some implementations of the invention described herein, the core switches learn only the source switch ID and they are never aged out. Since the number of switches in the network is limited this in general does not cause a problem. Since it is not guaranteed that traffic to and from a given host always takes the same path in both directions, the proposed scheme eliminates aging. The edge switches, when they learn end-host MAC addresses need to learn if a given end-host MAC needs to receive packets in-order. Also, edge switches need to request that they need in-order service for certain end-host MACs that connect to them. The following describes the invention with an example. Please note that though MNs are used in this example, MNs are not strictly tied to the in-order scheme and other methods, e.g., a conventional MAC-in-MAC (IEEE standard 802.1AH) scheme, could be used in place of MNs to facilitate learning end-host MAC addresses by edge switches.

Method 800 begins when packets are flooded for an unknown destination from a source which requires in-order receipt of frames. In step 805, a data frame is received from port 701 in switch A having a global DA value of MAC_B in field 405 and having InOrder bit 465 set. Field 460 indicates that the hierarchical address includes a source switch id (switch A). If MAC_B is a known destination, the frame will be unicast to that destination (step 855). However, in this example, MAC_B is an unknown global DA value.

Based on in-order bit intermediate switches (C and D) learn the source switch ID A (NOT the source MAC_A). (Step 815.) The frame is flooded according to STP. (Step 820.) Each successive switch receives the frame (step 825) and determines whether the global DA is on an LMT of that switch. (Step 830.) This procedure enables the intermediate switches to forward packets according to spanning tree on the return path based on the destination switch id. Accordingly, since MAC_B is not known by destination switch B, MAC_A is not learned. Only the hierarchical address of switch A is learned by switch B.

When the frame is received by switch B, the determination of step 830 will be positive. A response packet from MAC_A to MAC_B will be flooded along the spanning tree, because the MAC_A to switch A binding is not known by an RMT of switch B. (Step 835.) Here, field 460 would indicate that the hierarchical address of the frame is that of source switch B and InOrder bit 465 would not be set.

In step 845, switch A sends an MN frame along the spanning tree with in-order bit set to switch B. Switch B learns MAC_A and starts to send unicast frames along the spanning tree. (Step 850.) Here, the frames would indicate the hierarchical address of destination switch A and InOrder bit 465 would be set.

Figure 9:
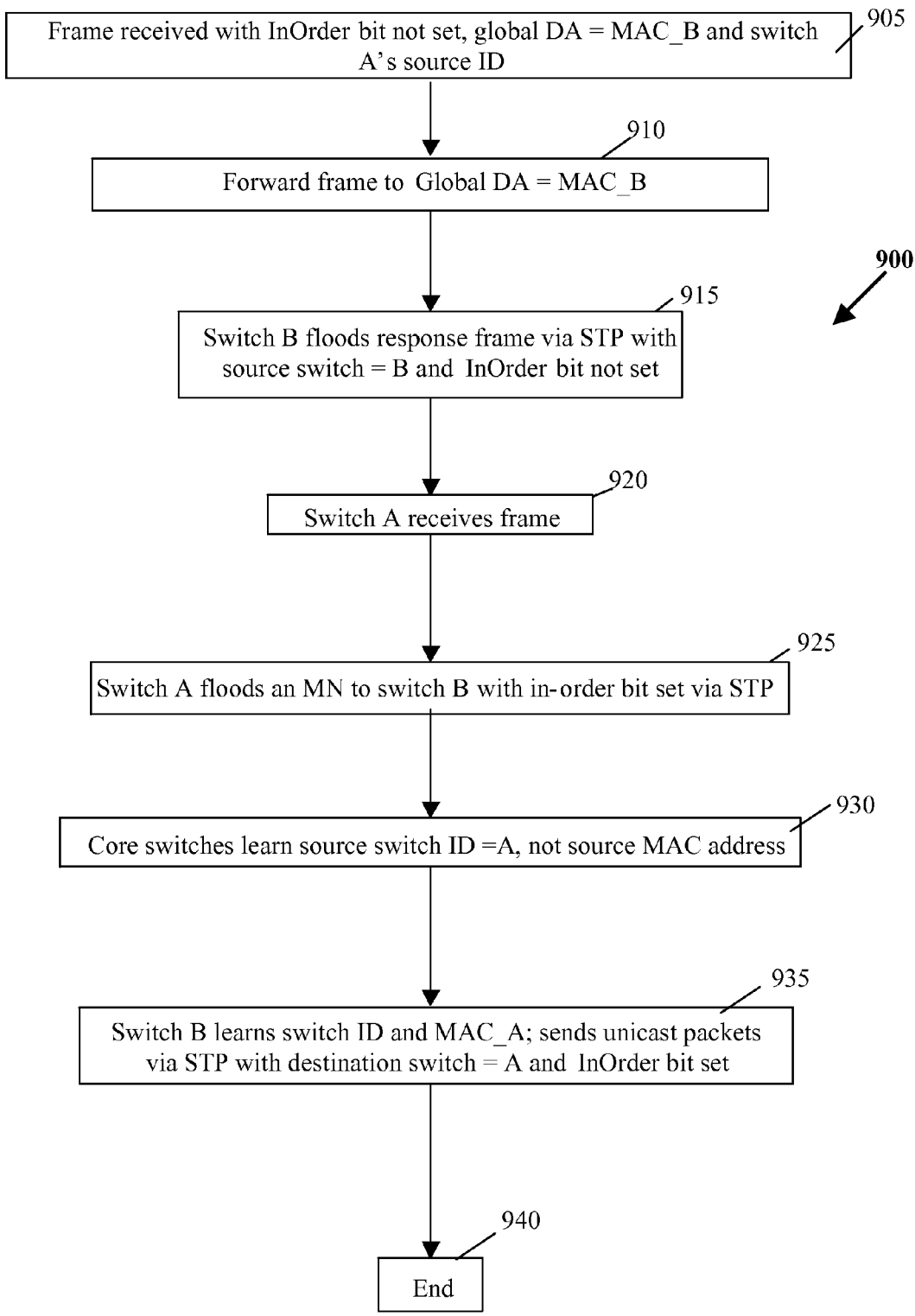
FIG. 9 is a flow chart that outlines alternative methods of the invention.

FIG. 9 is a flowchart that outlines the steps of alternative method 900, wherein MAC_B is known by switch A, but MAC_A is not known by switch B. When a frame is unicast from port 1 in switch A to MAC_B, InOrder bit 465 is not set. (Step 905.) This frame therefore follows the ECMP path to switch B. (Step 910.) Because switch B does not know where MAC_A is, switch B floods the return packets according to STP, indicating switch B as the source and without the InOrder bit set. (Step 915.)

Switch A receives the frame (step 920) and in response, switch A floods an MN frame with the InOrder bit set along the spanning tree to switch B. (Step 925.) Intermediate core switches learn the hierarchical address of switch A. (Step 930.) Switch B learns the hierarchical and MAC addresses of switch A and can then forward frames correctly along the spanning tree. (Step 935.)

According to some preferred implementations of the invention, the rules for aging are as follows. Switch IDs that are learned are never aged out. MACs are aged out at the edge switches as usual and relearned as needed. On a STP topology change notification, all switch IDs that were learned are purged. If needed, STP optimizations can be applied here to preserve entries that did not change.

FIG. 10 illustrates an example of a network device that may be configured to implement some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor 1074 and, in some instances, volatile RAM. Independent processors 1074 may be, for example ASICs or any other appropriate processors. According to some such embodiments, these independent processors 1074 perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "line cards"). Generally, interfaces 1068 control the sending and receiving of data packets over the network and sometimes support other peripherals used with the network device 1060. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system (e.g. Linux, VxWorks, etc.), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 10) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. An apparatus, comprising:
a processor; and
a memory, at least one of the processor or the memory being adapted for:
interfacing with a plurality of host devices, the plurality of host devices identified by Media Access Control (MAC) addresses; and
maintaining a first Remote MAC Table (RMT) that records a correspondence between MAC addresses of the host devices and hierarchical addresses of ports of a plurality of edge switches, wherein the apparatus is a first edge switch of the plurality of edges switches; and
populating a switch forwarding table ("SFT") of the first edge switch with a switch address of every other active core switch and edge switch in a network, wherein data packets are transferred according to the hierarchical addresses.

2. The apparatus as recited in claim 1, at least one of the processor or the memory being further adapted for:
populating a first local media access control ("MAC") table in the first edge switch with MAC addresses of local host devices attached to a first port of the first edge switch;
populating the first remote MAC table in the first edge switch with remote addresses of remote host devices that are attached to other ports and that have been communicating with at least one of the local host devices;
receiving a frame from a first host device via the first edge switch; and
determining whether a destination MAC address indicated in the frame is included in the first remote MAC table.

3. The apparatus as recited in claim 1, wherein a plurality of core switches transfer data packets according to the hierarchical addresses, individual core switches each containing a switch forwarding table (SFT) that contains hierarchical addresses of switches in the network and do not contain MAC addresses of the plurality of host devices.

4. The apparatus as recited in claim 3, wherein a SFT of each active core switch and a SFT of other edge switches in the plurality of edge switches are populated with the switch address of every other active core switch and edge switch in the network.

5. The apparatus as recited in claim 2, at least one of the processor or the memory being further adapted for:
encapsulating the frame with the first port's hierarchical address to create an encapsulated frame; and
flooding the encapsulated frame according to the spanning tree protocol ("STP") if it is determined that the destination MAC address indicated in the frame is not included in the first remote MAC table.

6. The apparatus as recited in claim 2, at least one of the processor or the memory being further adapted for:
if it is determined that the destination MAC address indicated in the frame is included in the first remote MAC table, obtaining a hierarchical address corresponding to the destination address from the first remote MAC table and sending the frame to the hierarchical address, the hierarchical address identifying a port of an edge switch of the network.

7. The apparatus as recited in claim 2, wherein the remote addresses include MAC addresses and hierarchical addresses.

8. The apparatus as recited in claim 1, wherein entries of each SFT are not aged out.

9. The apparatus as recited in claim 1, wherein each SFT is depopulated in response to topology change notifications.

10. The apparatus as recited in claim 9, wherein the topology change notifications comprise negative MAC Notification (MN) frames.

11. The apparatus as recited in claim 2, at least one of the processor or the memory being further adapted for:
sending an indication that the first port needs to receive frames in order.

12. The apparatus as recited in claim 1 wherein a hierarchical address of a port contains a switch ID and a port ID.

13. The apparatus as recited in claim 12 wherein the switch ID is unique within the network and the port ID is unique within a given switch, but is not unique within the network.

14. An apparatus, comprising:
a processor; and
a memory, at least one of the processor or the memory being adapted for:
interfacing with a plurality of host devices, the plurality of host devices identified by Media Access Control (MAC) addresses; and maintaining a first Remote MAC Table (RMT) that records a correspondence between MAC addresses of the host devices and hierarchical addresses of ports of a plurality of edge switches, wherein the apparatus is a first edge switch of the plurality of edges switches;

receiving a frame from a first host device via a first port of the first edge switch;

determining whether a destination MAC address indicated in the frame is included in the first remote MAC table;

encapsulating the frame with the first port's hierarchical address to create an encapsulated frame; and flooding the encapsulated frame using a spanning tree protocol ("STP") according to whether it is determined that the destination MAC address indicated in the frame is included in the first remote MAC table.

15. The apparatus as recited in claim 14, at least one of the processor or the memory being further adapted for:

populating the first remote MAC table in the first edge switch with remote addresses of remote host devices that are attached to other ports and that have been communicating with at least one of the local host devices.

16. The apparatus as recited in claim 14, at least one of the processor or the memory being further adapted for:

populating a switch forwarding table ("SFT") of the first edge switch with the switch address of every other active core switch and edge switch in a network.

17. An apparatus, comprising:

means for interfacing with a plurality of host devices, the plurality of host devices identified by Media Access Control (MAC) addresses; and means for maintaining a first Remote MAC Table (RMT) that records a correspondence between MAC addresses of the host devices and hierarchical addresses of ports of a plurality of edge switches, wherein the apparatus is a first edge switch of the plurality of edges switches;

means for receiving a frame from a first host device via a first port of the first edge switch;

means for determining whether a destination MAC address indicated in the frame is included in the first remote MAC table; and means for obtaining a hierarchical address corresponding to the destination address from the first remote MAC table and sending the frame to the hierarchical address if it is determined that the destination MAC address indicated in the frame is included in the first remote MAC table, the hierarchical address identifying a port of an edge switch of the network.

18. The apparatus as recited in claim 17, further comprising:

means for encapsulating the frame with the first port's hierarchical address to create an encapsulated frame; and means for flooding the encapsulated frame using a spanning tree protocol ("STP") if it is determined that the destination MAC address indicated in the frame is not included in the first remote MAC table.

19. The apparatus as recited in claim 17, further comprising:

means for receiving an encapsulated frame from a second one of the plurality of edge switches, the encapsulated frame including a source MAC address, a destination MAC address, and a hierarchical address;

means for determining whether a first local MAC table includes the destination MAC address;

means for adding the source MAC address and the hierarchical address of the encapsulated frame to the first remote MAC table of the first edge switch;

means for removing the hierarchical address from the encapsulated frame to form a decapsulated frame; and means for forwarding the decapsulated frame to a host device having the destination MAC address.

20. A method, comprising:

maintaining a first Remote Media Access Control (MAC) Table that records a correspondence between MAC addresses of a plurality of host devices and hierarchical addresses of ports of a plurality of edge switches, wherein the apparatus is a first edge switch of the plurality of edges switches;

receiving a frame from a first host device via a first port of the first edge switch;

determining whether a destination MAC address indicated in the frame is included in the first remote MAC table;

encapsulating the frame with the first port's hierarchical address to create an encapsulated frame; and flooding the encapsulated frame using a spanning tree protocol ("STP") according to whether it is determined that the destination MAC address indicated in the frame is included in the first remote MAC table.

* * * * *